(12) United States Patent
Dugas

(10) Patent No.: US 7,701,665 B2
(45) Date of Patent: Apr. 20, 2010

(54) WEAR PADS FOR TIMING-BASED SURFACE FILM SERVO HEADS

(75) Inventor: Matthew P. Dugas, St. Paul, MN (US)

(73) Assignee: Advanced Research Corporation, Minneapolis, MN (US)

( * ) Notice: Subject to any disclaimer, the term of this patent is extended or adjusted under 35 U.S.C. 154(b) by 0 days.

(21) Appl. No.: 11/271,394

(22) Filed: Nov. 10, 2005

(65) Prior Publication Data

US 2006/0061906 A1 Mar. 23, 2006

Related U.S. Application Data

(60) Division of application No. 10/277,773, filed on Oct. 22, 2002, now Pat. No. 6,989,960, which is a continuation of application No. 09/475,420, filed on Dec. 30, 1999, now Pat. No. 6,496,328.

(51) Int. Cl.
*G11B 5/29* (2006.01)
*G11B 5/133* (2006.01)
*G11B 5/187* (2006.01)

(52) U.S. Cl. ........................... 360/121; 360/122
(58) Field of Classification Search ............ 360/121, 360/122, 125, 126, 127, 119, 110
See application file for complete search history.

(56) References Cited

U.S. PATENT DOCUMENTS

| | | | |
|---|---|---|---|
| 3,192,608 A | 7/1965 | Rinla et al. | |
| 3,417,386 A | 12/1968 | Schneider | |
| 4,298,899 A | 11/1981 | Argumedo et al. | |
| 4,673,999 A | 6/1987 | Suyama et al. | |
| 4,685,012 A | 8/1987 | De Wit et al. | |
| 4,752,850 A | 6/1988 | Yamada et al. | |
| 4,901,178 A | 2/1990 | Kobayashi et al. | |
| 5,093,980 A | 3/1992 | Maurice et al. | |
| 5,124,869 A * | 6/1992 | Lehureau | 360/121 |
| 5,394,285 A * | 2/1995 | Dee et al. | 360/121 |

(Continued)

FOREIGN PATENT DOCUMENTS

DE 2912309 A 10/1979

(Continued)

OTHER PUBLICATIONS

IBM TDB "Hybrid Thin R W Head with Bonding by Laser Beam", vol. 19, issue No. 2, pp. 681-682 (Jul. 1976).

(Continued)

*Primary Examiner*—William J Klimowicz
(74) *Attorney, Agent, or Firm*—Dorsey & Whitney LLP; Nathan J. Witzany, Esq.

(57) ABSTRACT

A thin film magnetic recording head is provided with a tape bearing surface that has magnetically isolated channels while still providing a maximum continuous surface area with which to engage the media. This can be accomplished by providing spaces in the magnetically permeable thin film that are large enough to prevent cross-talk between the channels, but small enough to prevent significant interference with the moving media. Alternatively, magnetically impermeable thin film spacers can be provided to magnetically isolate each of the channels. The spacers are generally even with the magnetically permeable thin film so as to provide a continuous media-bearing surface.

4 Claims, 13 Drawing Sheets

U.S. PATENT DOCUMENTS

| | | | |
|---|---|---|---|
| 5,423,116 A | 6/1995 | Sundaram | |
| 5,452,152 A | 9/1995 | Rudi | |
| 5,452,165 A | 9/1995 | Chen et al. | |
| 5,506,737 A | 4/1996 | Lin et al. | |
| 5,572,392 A | 11/1996 | Aboaf et al. | |
| 5,652,015 A * | 7/1997 | Aboaf et al. | 427/116 |
| 5,666,249 A | 9/1997 | Ohmori et al. | |
| 5,689,384 A | 11/1997 | Albrecht et al. | |
| 5,715,597 A | 2/1998 | Aylwin et al. | |
| 5,909,346 A | 6/1999 | Malhotra et al. | |
| 6,005,737 A | 12/1999 | Connolly et al. | |
| 6,236,538 B1 | 5/2001 | Yamada et al. | |
| 6,269,533 B2 * | 8/2001 | Dugas | 29/603.13 |
| 6,496,328 B1 | 12/2002 | Dugas | |
| 6,894,869 B2 | 5/2005 | Dugas | |
| 7,130,152 B1 * | 10/2006 | Raymond et al. | 360/121 |
| 7,196,870 B2 * | 3/2007 | Dugas | 360/122 |
| 7,218,476 B2 * | 5/2007 | Dugas | 360/131 |
| 2001/0003862 A1 | 6/2001 | Dugas | |
| 2001/0045005 A1 | 11/2001 | Dugas | |

FOREIGN PATENT DOCUMENTS

| | | | |
|---|---|---|---|
| EP | 407244 A | 1/1991 | |
| EP | 0 690 442 A | 1/1996 | |
| EP | 913813 A2 | 5/1999 | |
| EP | 328104 A2 | 8/1999 | |
| JP | 01064104 A | 3/1989 | |
| JP | 03078104 A * | 4/1991 | |
| JP | 03198210 A | 8/1991 | |
| JP | 3-269804 | 12/1991 | |
| JP | 06089412 A | 3/1994 | |
| JP | 06243429 A * | 9/1994 | |
| JP | 06301926 A * | 10/1994 | |
| JP | 09138912 A * | 5/1997 | |
| JP | 9-21906 | 8/1997 | |
| JP | 09219010 A | 8/1997 | |
| JP | 10011714 A * | 1/1998 | |
| JP | 11353609 A * | 12/1999 | |
| WO | WO 9705603 A1 | 2/1997 | |
| WO | WO 9950834 A1 | 10/1999 | |
| WO | WO 99/6777 | 12/1999 | |
| WO | WO 01/50463 A1 | 7/2001 | |

OTHER PUBLICATIONS

Barrett et al., "Timing-Based Track-Following Servo for Linear Tape Systems," Jul. 1998, IEEE Transactions on Magnetics, vol. 34, No. 4, pp. 1872-1877.

Richard H. Dee et al., "Advanced Multi-Track Tape Head for High Performance Tape Recording Application", IEEE Transactions on Magnetics, vol. 35, No. 2, Mar. 2, 1999, pp. 712-717.

* cited by examiner

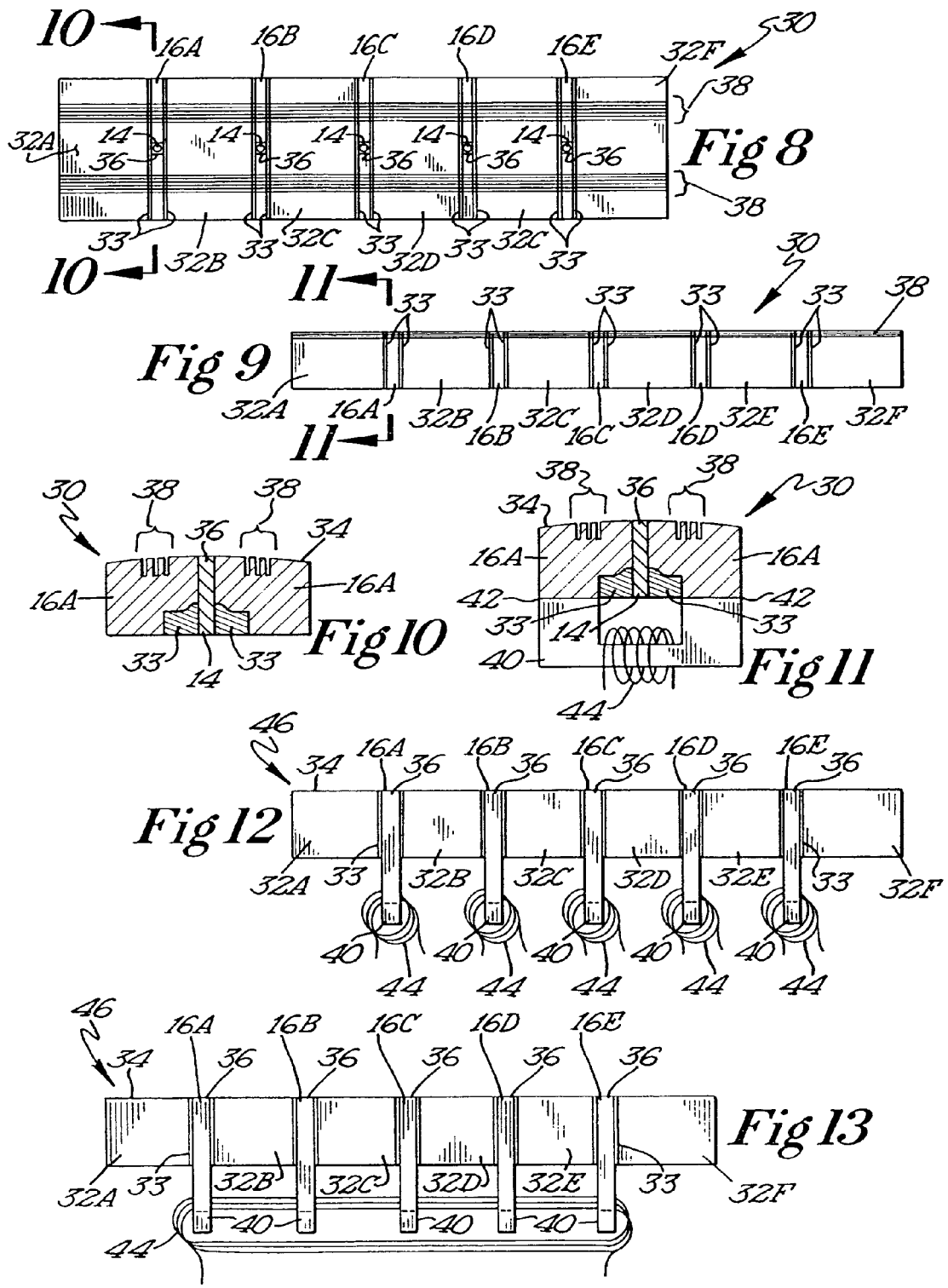

WEAR PADS FOR TIMING-BASED SURFACE FILM SERVO HEADS

CROSS-REFERENCE TO RELATED APPLICATION

This Application is a divisional application of U.S. Ser. No. 10/277,773, filed Oct. 22, 2002, now U.S. Pat. No. 6,989,960, which is a continuation-in-part of U.S. Ser. No. 09/475,420 filed Dec. 30, 1999, now U.S. Pat. No. 6,496,328, the subject matter of which is hereby incorporated by reference in its entirety.

FIELD OF THE INVENTION

This invention relates generally to magnetic recording heads and more particularly to thin film magnetic recording heads having wear pads to minimize media degradation and head wear.

BACKGROUND OF THE INVENTION

While a variety of data storage mediums are available, magnetic tape remains a preferred forum for economically storing large amounts of data. In order to facilitate the efficient use of this media, magnetic tape will have a plurality of data tracks extending in a transducing direction of the tape. Once data is recorded onto the tape, one or more data read heads will read the data from those tracks as the tape advances, in the transducing direction, over the read head. It is generally not feasible to provide a separate read head for each data track, therefore, the read head(s) must move across the width of the tape (in a translating direction), and center themselves over individual data tracks. This translational movement must occur rapidly and accurately.

In order to facilitate the controlled movement of a read head across the width of the media, a servo control system is generally implemented. The servo control system consists of a set of dedicated servo tracks embedded in the magnetic media and a corresponding servo read head (which may be one of the standard read heads, temporarily tasked to servo functions) which correlates the movement of the data read heads.

The servo track contains data, which when read by the servo read head is indicative of the relative position of the servo read head with respect to the magnetic media in a translating direction. In one type of traditional amplitude based servo arrangement, the servo track was divided in half. Data was recorded in each half-track, at different frequencies. The servo read head was approximately as wide as the width of a single half-track. Therefore, the servo read head could determine its relative position by moving in a translating direction across the two half-tracks. The relative strength of a particular frequency of servo signal would indicate how much of the servo read head was located within that particular half-track. The trend toward thinner and thinner magnetic tape layers causes amplitude modulation problems with this and other amplitude based heads. That is, as the thickness of the magnetic layer decreases, normal variations on the surface represent a much larger percentage variation in the magnetic layer, which will dramatically affect the output signal.

Recently, a new type of servo control system was created which allows for a more reliable positional determination by reducing the amplitude based servo signal error traditionally generated by debris accumulation and media thickness non-uniformity. U.S. Pat. No. 5,689,384, issued to Albrecht et al. on Nov. 19, 1997, introduces the concept of a timing based servo pattern on a magnetic recording head.

In a timing based servo pattern, magnetic marks (transitions) are recorded in pairs within the servo track. Each mark of the pair will be angularly offset from the other. For example, a diamond pattern has been suggested and employed with great success. The diamond will extend across the servo track in the translating direction. As the tape advances, the servo read head will detect a signal or pulse generated by the first edge of the first mark. Then, as the head passes over the second edge of the first mark, a signal of opposite polarity will be generated. Now, as the tape progresses, no signal is generated until the first edge of the second mark is reached. Once again, as the head passes the second edge of the second mark, a pulse of opposite polarity will be generated. This pattern is repeated indefinitely along the length of the servo track. Therefore, after the head has passed the second edge of the second mark, it will eventually arrive at another pair of marks. At this point, the time it took to move from the first mark to the second mark is recorded. Additionally, the time it took to move from the first mark (of the first pair) to the first mark of the second pair is similarly recorded.

By comparing these two time components, a ratio is determined. This ratio will be indicative of the position of the read head within the servo track, in the translating direction. As the read head moves in the translating direction, this ratio will vary continuously because of the angular offset of the marks. It should be noted that the servo read head is relatively small compared to the width of the servo track, so that a continuously variable timing difference 15 provided as the servo read head traverses the servo track. Because position is determined by analyzing a ratio of two time/distance measurements, taken relatively close together, the system is able to provide accurate positional data, independent of the speed (or variance in speed) of the media.

Of course, once the position of the servo read head is accurately determined, the position of the various data read heads can be controlled and adjusted with a similar degree of accuracy on the same substrate. Namely, the various read heads are fabricated on the same substrate with a known spacing between them. Hence knowing the location of one allows for a determination of the location of the remainder of the read heads.

When producing magnetic tape (or any other magnetic media) the servo track is generally written by the manufacturer. This results in a more consistent and continuous servo track, over time. To write the timing based servo track described above, a magnetic recording head bearing the particular angular pattern as its gap structure, must be utilized. As it is advantageous to minimize the amount of tape that is dedicated to servo tracks, to allow for increased data storage, and it is necessary to write a very accurate pattern, a very small and very precise servo recording head element must be fabricated.

Two types of servo recording heads having a timing based pattern are known. The first is a pure thin film head, such as that disclosed by Aboaf et al. in U.S. Pat. No. 5,572,392, issued on Nov. 5, 1996. With a pure thin film head, all of the components of the head are created from layering different materials, as thin films, on an inert substrate. For example, the magnetic core, and the windings and any barrier materials are formed by producing thin films. Such a head has very low inductance; however, it is extremely difficult to manufacture. To date, pure thin film heads are generally not utilized for time based servo heads and are not seen as a practical way to produce such a magnetic head.

A very different type of recording head is taught by Albrecht et al. in the '384 patent. This second type of head is referred to herein as a surface film or surface thin film head and is illustrated as 100, in FIG. 18. The surface film head 100 includes two C-shaped ferrite blocks 110, 112 that are bonded to a ceramic member 114 that extends the entire width of the head 100. A surface is then polished flat or contoured and prepared for this film deposition. A magnetically permeable thin film 116 is deposited over an upper surface of the ferrite blocks 110, 112 and the exposed upper portion of the ceramic member 114. The thin film 116 is shown much larger than it would actually be, respective to the other elements. Gaps 118 are formed in the thin film 116, in an appropriate timing based pattern. Windings 120 are wrapped and are electrically driven to drive flux around the ferrite core and through the thin film 116 (in the direction of arrow A). The flux leaks from the gaps 118 and writes media passing over it.

Such a surface film head has a high inductance due to the large volume of ferrite forming the core and a high reluctance "back-gap", due to the separation of the ferrite block 110, 112 by the ceramic member 114, on the underside of the head (i.e., opposite the thin film 116). The size and dimensions of the head are determined by the end use characteristics. For example, the width of the head 100 is defined by the width of the media; i.e., a head that is 19 mm wide is appropriate to support a tape that is 12.5 mm wide. The ceramic member 114 must be thick enough to allow the proper angular patterns 118 to be located above it and is approximately 0.012" in the known versions of the Albrecht et al. head, produced by IBM. The length of the head must be sufficient to support the media as it travels over the tape bearing surface and the depth (especially of the ferrite cores) must be sufficient to allow appropriate windings to be attached and to allow the head to be securely fixed in a head mount.

With the surface film head, flux is forced to travel through a magnetically permeable thin film that bridges a generally magnetically impermeable barrier between sections of the core. The writing gap is located within this thin film and the magnetic flux is expected to leak from this gap and write the media. The width of the ferrite is much larger than the sum of the channel widths. Hence, there is a large amount of unnecessary ferrite inductance. In other words, as a result of the relatively large amount of extraneous ferrite, an unnecessarily high amount of inductance is created. Therefore, to produce a relatively small amount of flux leakage through a small gap in the thin film, very high levels of voltage are required to generate sufficient magnetic flux throughout the relatively large core. This lowers the frequency response of the head and increases the rise time of the writing pulses from the head.

Therefore, there exists a need to provide efficient multi-channel timing based head having the ability to individually and separately drive and control each channel.

SUMMARY OF THE INVENTION

The present invention relates to a low inductance, high efficiency sub-gap, surface thin film magnetic recording head and a method of fabricating the same.

A substrate consisting of a ceramic member, glass bonded between a pair of ferrite blocks is prepared. After the substrate is created, it is diced to form a base from which a plurality of columns extend. The number of columns will correspond to the eventual number of channels in a completed recording head. A ceramic block is prepared which corresponds to the dimensions of the substrate. Channels or notches are cut into the ceramic block so that the substrate columns engage them in a male/female relationship. The channels allow for the entirety of the column to be accepted within the channel so that the base of the substrate flushly abuts the corresponding base of the ceramic block. The ceramic block is then adhered to the substrate. In particular, the columns of the substrate are glass bonded to the interior of the channels in the ceramic block, thus forming a head member.

The top and bottom of the head member are then cut or ground to produce a uniform block of alternating ceramic portions and substrate columns wherein each substrate column includes a sub-gap. A sufficient amount of the head member is cut or ground so that the substrate columns extend through the entire height of the remaining portion of the head member. During this process, the upper portion of the head member can be appropriately radiused, as it is this section which will become the tape-bearing surface of the writing head.

A separate winding may be provided for each channel, thus allowing each channel to be separately driven and controlled. Alternatively, any particular combination of channels can be tied together. When the channels are timed and driven independently, sections of the magnetically permeable thin film must be removed between the channels. This prevents magnetic flux from passing from one channel to another through the thin film layer. It is the prevention of this cross talk, which allows the multi-channel head to have its channels driven independently in time or phase. To produce such isolation, sections of the thin film can be removed by ion milling, wet chemical etching, or by any other known process. Other techniques such as selective plating or selective sputtering could also be used. Alternatively, when the channels are driven by a common winding, cross talk would not necessarily be an issue. However, it would still be advantageous to remove the magnetically permeable material between the channels to achieve improved linearity and eliminate unwanted flux leakage around the gaps.

In one embodiment, the present recording head provides a magnetically impermeable barrier between each channel so that actuation of one channel will in no way interfere with any other channel in the head. Hence, a significant portion of the magnetic volume of the head laying between each channel has been replaced with a non-organic ceramic material.

In another aspect of the present invention, the magnetically permeable thin film layer is optimally configured to complete a magnetic circuit for each channel, while limiting mechanical interference of the film with the air bleed slots. Consideration must be given to the minimal requirements for completing the circuit and the engagement of the media against a head having a non-planar surface while minimizing the complexity of providing the air bleed slots. In addition, when working with components of this scale, consideration must be given to the etching or milling technique utilized to impart and define the thin film layer so that mechanical shear or peeling of the film is not induced by the tape's motion.

In yet another aspect of the present invention, the individual channels are magnetically isolated from one another. To do so, the magnetically permeable thin film that covers the tape-bearing surface of the recording head is sectioned. That is, sections of thin film are removed or only the appropriate pattern is deposited. Thus, thin film only exists where it is required to complete a magnetic circuit for each channel. Because of the relatively small dimensions of the thin film layer, it is possible to pass the media over a head that is made non-continuous by the positioning of the magnetically conductive sections. That is, the spaces that are formed by the absence of the thin film layer are not an impediment to utilizing the head.

That being said, the spaces can cause the thin film to wear faster and can possibly cause media degradation. To prevent these negative effects while still achieving magnetic channel separation, the present invention utilizes wear pads. These wear pads can either be sections of the magnetically permeable thin film that fill in a majority of the spaces described above or a magnetically impermeable material can actually be deposited to fill in the spaces. Additionally, a combination of the two techniques can also be utilized.

It is desirable to produce as close to a linear cross section as possible. Thus, whatever material serves as the wear pad should approximate the thin film layer in height and in its wear characteristics. That is, it would be undesirable to deposit a material that will be worn away quickly with respect to the wear of the thin film layer (or vice versa).

BRIEF DESCRIPTION OF THE DRAWINGS

FIG. 8 is a top view of a head assembly.

FIG. 9 is a side view of a head assembly.

FIG. 10 is an end sectional view taken about line 10-10.

FIG. 11 is an end sectional view taken about line 10-10 and having a back-bar attached.

FIG. 12 is a side view of a head assembly having a plurality of back-bars affixed thereto, with coils individually wrapped about each back-bars.

FIG. 13 is a side view of a head assembly having a plurality of back-bars affixed thereto, with a single coil wrapped about all of the back-bars.

DETAILED DESCRIPTION OF THE PREFERRED EMBODIMENT

Figure 1:
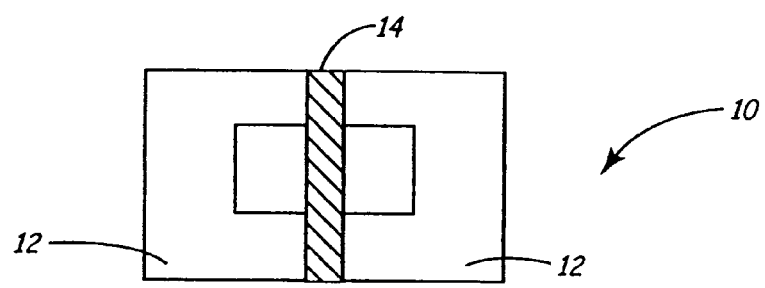
FIG. 1 is a side planar view of a substrate composed of ferrite blocks glass bonded to a ceramic member.
Figure 2:
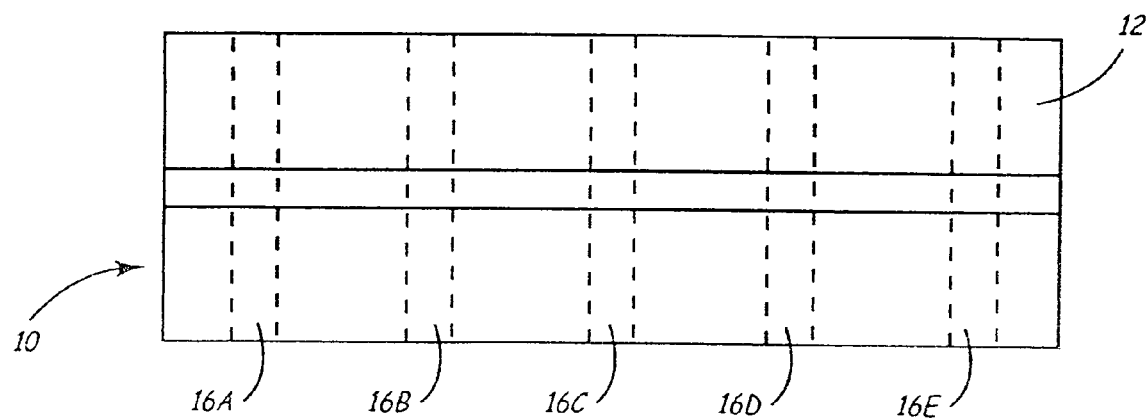
FIG. 2 is a top planar view of the substrate shown in FIG. 1.

The present invention is a multi-channel head and method of making the same. Referring to FIG. 1, a substrate 10 is created by glass bonding two C-shaped ferrite blocks 12 to a medially disposed ceramic member 14. The sizes, shapes and relative proportions of the ferrite blocks 12 and ceramic member 14 may vary as dictated by the desired parameters of the completed recording head. Furthermore, the choice of materials may also vary so long as blocks 12 remain magnetically permeable while member 14 remains substantially magnetically impermeable. FIG. 2 is a top view of the substrate 10.

Figure 3:
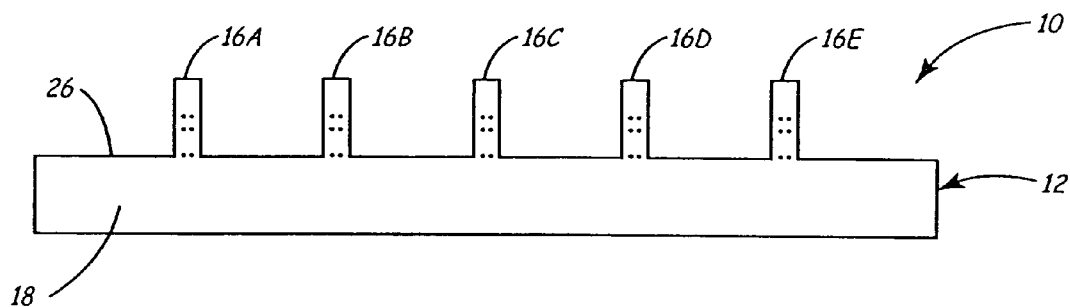
FIG. 3 is a side view of the substrate of FIG. 1, diced into a plurality of columns.
Figure 4:
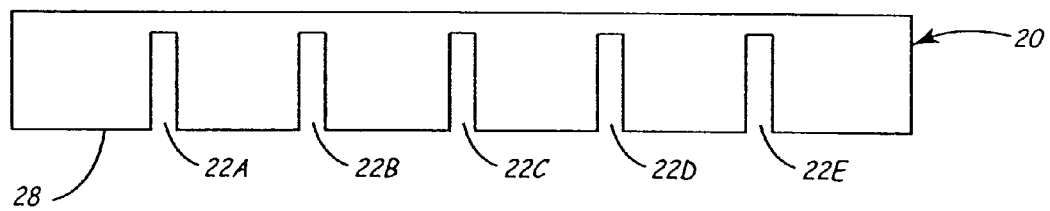
FIG. 4 is a side view of a ceramic block having a plurality of notches.

Referring to FIG. 3, substrate 10 is diced so as to form a plurality of columns 16A-16E which remain adhered to base 18. Columns 16A-16E are also shown by the dashed lines in FIG. 2, which illustrates how each column will have a ceramic portion (sub-gap) bonded between two ferrite poles. The dashed lines are merely illustrative of future columns, as the substrate 10 in FIG. 2 has yet to be diced. As shown is FIG. 4, a ceramic block 20, or slider, is cut to form a plurality of channels or notches 22A-22E. The ceramic block 20 can be formed from barium titanate, or any other suitable magnetically impermeable material. The notches 22A-22E are cut to correspond with columns 16A-16E. As such, the relative size and shape of the columns 16A-16E and the notches 22A-22E should correspond; beyond that the selection of size and shape will simply depend on the desired final parameters of the completed magnetic head.

Figure 5:
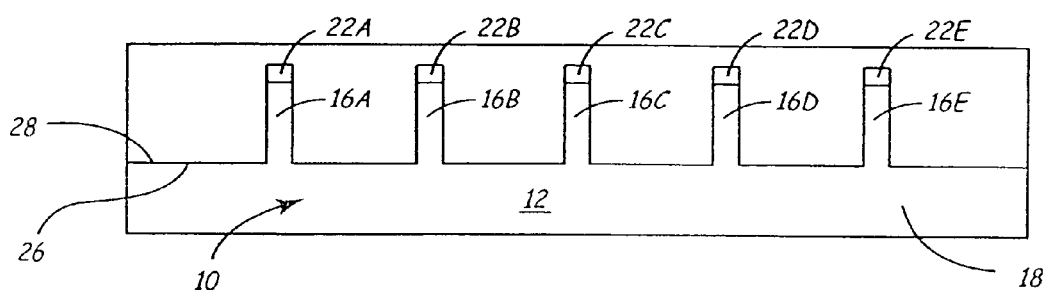
FIG. 5 is a side view of the ceramic block and the substrate bonded together.

As illustrated in FIG. 5, substrate 10 is mated with ceramic block 20. More specifically, columns 16A-16E are inserted into notches 22A-22E until the upper surface 26 of the base 18 of substrate 10 flushly meets the lower surface 28 of ceramic block 20. Subsequently, substrate 10 is adhered to ceramic block 20. This can be accomplished in any known way. In its most preferred form, substrate 10 is glass bonded to ceramic block 20. To accomplish this, the substrate 10 is clamped or otherwise secured to ceramic block 20, as shown in FIG. 5. Glass rods are placed into the various notches 22A-22E, in a space left by the columns 16A-16E. The assembly is then heated to a temperature sufficient to melt the glass rods. This causes the melted glass to wick along the abutting sides of the columns 16A-16E and the notches 22A-22E. Once allowed to cool, the glass hardens and bonds the members together.

Figure 6:
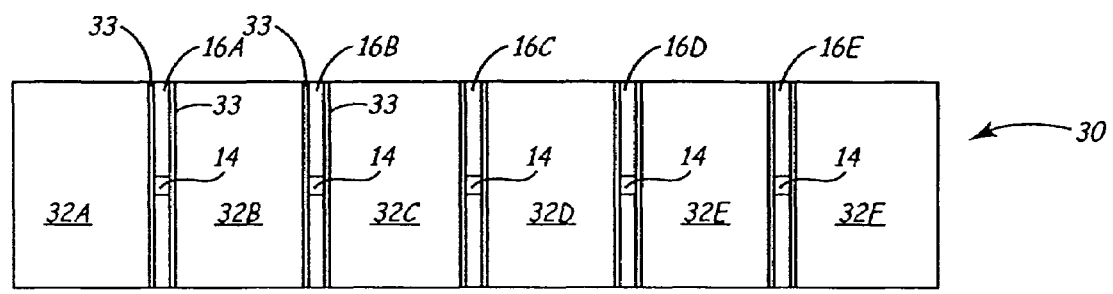
FIG. 6 is a top view of the bonded substrate after the top and bottom have been cut or ground.
Figure 7:
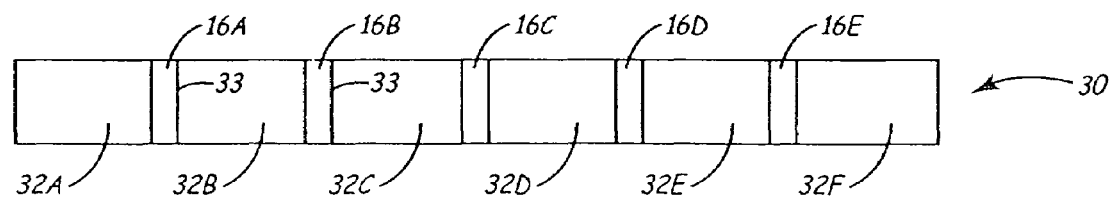
FIG. 7 is a side view of the bonded substrate after the top and bottom have been cut or ground.

The top and the bottom of this assembly are then cut or ground away to arrive at the head substrate 30 shown in FIGS. 6 and 7. From a top view and moving left to right (as illustrated), head substrate 30 has a ceramic portion 32A, which is a remainder of ceramic block 20. A bead of glass 33 bonds ceramic portion 32A to ferrite column 16A. Medially dissecting ferrite column 16A is a portion of ceramic member 14, which is likewise glass bonded to ceramic portion 32A. It is to be understood that the portion of the non-magnetic ceramic member 14 extends through the entire length of the remaining ferrite column 16A, thus dividing it into two magnetic poles. Glass bonds 33 likewise join ceramic portion 32B between ferrite columns 16A and 16B. This pattern is repeated across the head, with the number of ferrite columns 16A-16E, representing the eventual number of channels in the completed write head. FIG. 7 is a side view of head substrate 30 and illustrates that the ferrite columns 16A-16E (with included sections of ceramic member 14, not visible in this view) forming a sandwich pattern with the ceramic portions 32A-32F. As illustrated (in FIG. 4), the notches 22A-22E extend through the entire width of the ceramic block 20. Thus, the ferrite columns 16A-16E are visible from a side view (FIG. 7).

Head substrate 30 is now ready to be formed into a completed magnetic recording head. To summarize the remainder of the fabrication, a slight radius or curvature is caused on the upper surface of the head substrate 30. This step could occur when removing the top section from the bonded substrate 10 and ceramic block 20, or it could be done at this stage as a separate operation. The curvature is imparted to the head substrate 30 because its upper surface will become the tape-bearing surface of the completed head. This curvature facilitates smooth contact with the media under tension. A magnetically permeable thin film layer 34 is deposited across the upper surface of the head substrate 30. Writing gaps 36 (FIG. 8) are caused to be formed in this thin film 34, aligned with the visible portion of ceramic member 14, or in other words, above the sub-gap. Alternatively, the head contour could be finished into a generally flat surface having integrated negative pressure channels. The use of these various contours is known in the art.

Either prior to depositing the thin film or after, air bleed slots 38 may be cut into head substrate 30 along the tape-bearing surface as is known in the art. Once head substrate 30 has been fabricated into a recording head, magnetic tape will move across its upper surface in a transducing direction. Therefore, the air bleed slots 38 are cut perpendicular to the transducing direction. As the tape moves over the recording head at relatively high speed, air entrainment occurs. That is, air is trapped between the lower surface of the tape and the upper surface of the recording head. As the tape moves over the recording head, the first air bleed slot encountered serves to skive off the trapped air. The second and subsequent slots continue this effect, thus serving to allow the tape to closely contact the recording head. As the tape passes over the recording gaps 36, it is also held in place by the other air bleed slots 38 encountered on the opposite side of the gaps 30.

FIG. 10 is an end, partially sectional view of head substrate 30 taken about line 10-10. This figure illustrates the relationship between the ferrite column 16A and the remaining portion of ceramic member 14. Thin film layer 34 is located on its upper surface and write gaps 36 are located immediately above the portion of ceramic member 14. Air bleed slots 38 are located on opposite side of ceramic member 14 and traverse the whole assembly. FIG. 11 illustrates the back-bar 40 of the present invention as it is attached to ferrite column 16A (again an end, partially sectional view taken about line 10-10). Back-bar 40 is a substantially U-shaped ferrite block which is caused to abut each side of the ferrite column 16A. The shape is chosen to efficiently complete a magnetic circuit and allows a coil 44 to be wound. The back-bar 40 flushly abuts column 16A and is held in place by a bonding agent that is applied at glue points 42. The use of back-bars 40 is advantageous in and of itself. In other words, using the back-bar 40 of the present invention will allow a better surface film head to be produced irrespective of the number of channels formed, or whether the combed structure is utilized to achieve channel separation or to lower stray inductance by reducing the volume of magnetically permeable material in the core.

By using the columned or combed structure, the volume of unnecessary or non-useful magnetically permeable materials is greatly reduced, thus decreasing the overall inductance of the head. As such, the frequency response is dramatically increased, thus allowing faster and more accurate writing of data on the media. This is possible because the inducement of sufficient magnetic flux requires substantially less energy input. As such, the rise time of the written pulse is substantially shortened. Thus allowing for a sharper written transition in the media.

The above description relates to the general fabrication of a highly efficient surface thin film magnetic recording head according to the teachings of the present invention. That is, by using the columned (or combed) structure for the body of the head which reduces the overall inductance of the head, and by applying back-bars 40 which reduces the reluctance, an improved head is necessarily formed. In addition there are various other parameters which can be modified to apply the head of the present invention to a wide variety of writing functions. It should be noted that simply using a combed or columned structure in and of itself produces a better, more efficient head. Likewise, the use of back-bars 40 is also independently advantageous and can be utilized on heads having a combed or non-combed core, as efficiency will be increased in both cases.

Referring to FIGS. 12 and 13, two substantially completed heads 46 are shown. In FIG. 12, head 46 is a multi-channel head having five independent channels. That is, each channel can be individually triggered and caused to write independent of the other four channels. To accomplish this, each back-bar 40 has its own coil 44 wrapped about it. In a variety of known ways, these coils 44 can be coupled to a controller and appropriately driven. In FIG. 13, the back-gaps 40 are configured in the same way, however a single coil 44 is coupled to all of the back-gaps 40. In this way, when the coil is energized, the various channels will each write simultaneously. Any intermediate combination is likewise achievable. That is, the individually wrapped coils 44 (FIG. 12) can be tied together, achieving the same result as utilizing a single coil 44. Alternatively, any number or combination of channels can be coupled mechanically or electrically together. In this embodiment, each back-bar 40 is sized to correspond to an individual channel. As discussed, these back-bars 40 can then be separately wound or wound as a single unit.

An additional advantage of separately driving each channel individually, is the ability to fine-tune each channel. As is known in the art and is generally represented by an "I-Sat" curve, each head and more particularly each channel may saturate at slightly different levels of ampere-turns. Therefore, it is desirable to select a particular level of current input to maximize the efficiency and output of each channel. This optimal value may very slightly from channel to channel. As such, by performing this evaluation for each channel, the optimal current input for each channel can be determined. This information is moot in those heads where all the channels are driven by a single coil. However, with independently driven channels, each channel may be driven at its optimal level of ampere-turns.

The head 46 of the present invention has been shown to have five channels. Any number of servo channels could be so fabricated. Five channel or two channel heads seem to be an industry standard for the moment.

The choice to produce a multi-channel head having independent channels or one having its channels tied together also affects the application of the thin film 34 to the tape bearing surface of the head 46. More specifically, a multi-channel head having independently driven channels may need to have those channels magnetically isolated from one another to avoid cross talk, depending upon the timing of the information being written.

When cross talk is not an issue, the surface thin film layer 34 can extend across the entire surface of the head, producing a unitary sheet film. However, the areas of sheet film between the channels may not be well saturated, due to the limited width of the channels and hence the driven core(s), in relation to the overall area of the sheet film. Thus, the areas of sheet film between adjacent channels will provide an undesirable high permeable flux leakage path which limits the amount of signal flux actually passing across the writing gaps 36 thus resulting in a non-linear output from a servo read head as a function of position along the servo band. Hence, even when cross-talk is not an issue, the preferred embodiment of the low inductance, multi-channel timing based servo head of the present invention will include a separate thin film layer 34 that is dedicated to a single channel and is magnetically isolated from the adjacent channels. The process of providing channel separated thin film 34 areas is discussed below.

In addition, the application of the thin film 34 affects the creation of the air bleed slots 38. Namely, if the slots 38 are cut into the head 46 after the thin film 34 has been deposited, rough corners may be produced which negatively affects the interaction between the head 46 and the media. If the thin film 34 is deposited after the slots are cut, thin film step coverage and adhesion over the slots becomes yet another issue.

The present invention contemplates a variety of techniques to deal with the above mentioned considerations. The particular technique selected will also depend on the method used to form the writing gaps 36 into the thin film layer 34.

Figure 14:
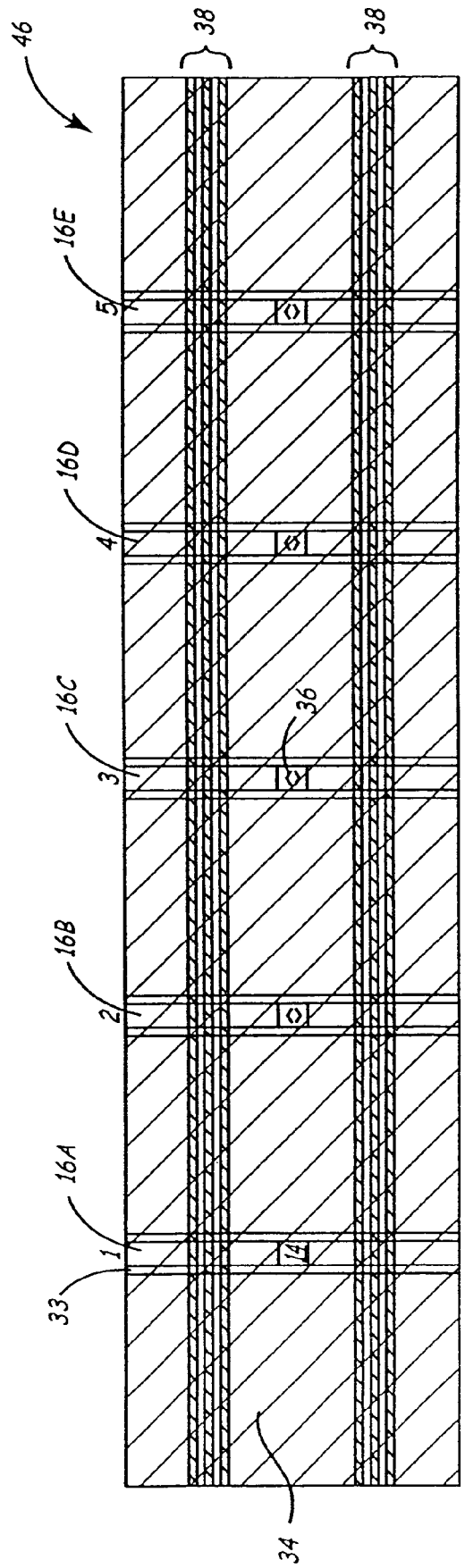
FIG. 14 is a head assembly showing a pattern of thin film.

FIG. 14 represents the simplest head fabrication format. Here, head 46 is a multi-channel head wherein the various channels are all coupled together. Though not shown, the gaps 36 will be patterned into each channel above the ceramic member 14 (i.e., that of FIG. 13). Thin film layer 34 (designated by the hash lines) has been deposited over the entire surface of head 46. As discussed above, this makes the cutting of air bleed slots 38 problematic. However, this problem can be reduced by slitting the heads prior to applying the film. As such, a relatively high quality head 46 can be produced. The advantage of such an arrangement is that the thin film layer 34 provides a uniform tape-bearing surface over the entirety of the upper surface of head 46. Conversely, the photolithography becomes more difficult due to the presence of these slots.

Figure 15:
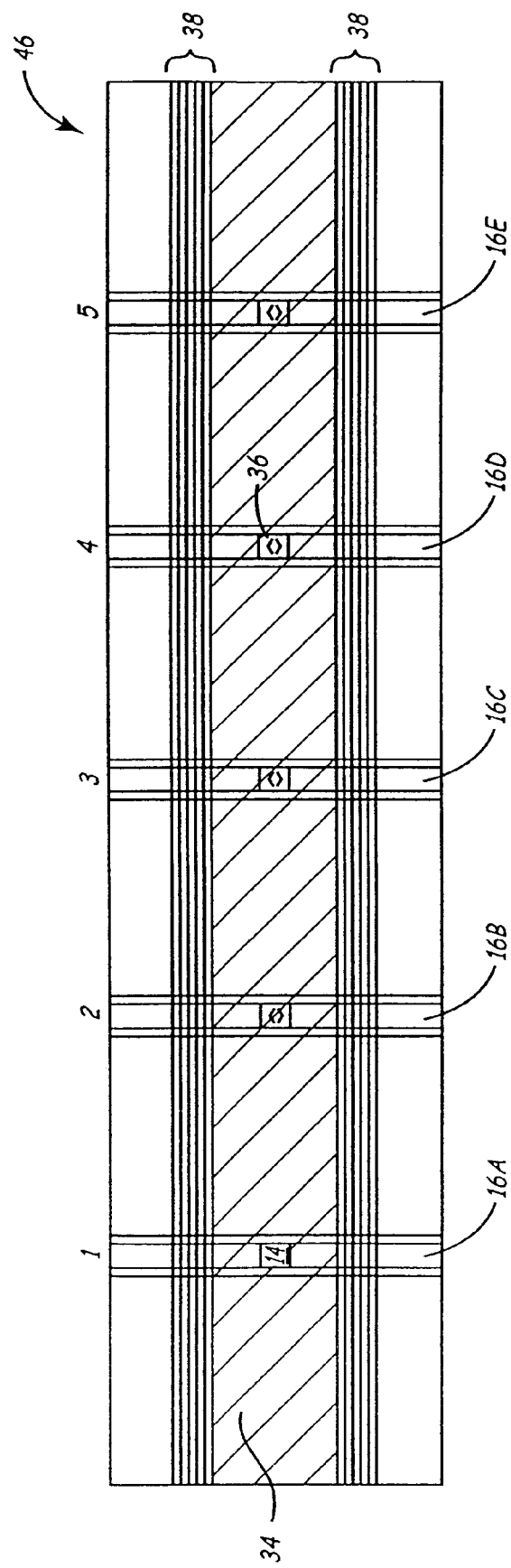
FIG. 15 is a head assembly showing a thin film.

FIG. 15 represents a modified embodiment of a multi-channel head wherein the channels are all coupled together. Once again, cross talk between channels is not an issue. Here, thin film layer 34 is contained between upper and lower bounds defined by air bleed slots 38. This arrangement avoids the above discussed issue of cutting through the thin film layer 34 or depositing the thin film layer 34 over existing air bleed slots 38. The production of this thin film 34 pattern can be accomplished in various ways. For example, prior to creating air bleed slots 38, a thin film 34 could be deposited over the entire upper surface of head 46. Then, areas of that thin film could be removed; leaving only the area designated in FIG. 15. This deposition could be selectively defined by a selective plating or a selective sputtering process used with the appropriate masks, or the film could be selectively removed after deposition, using any known technique.

Figure 16:
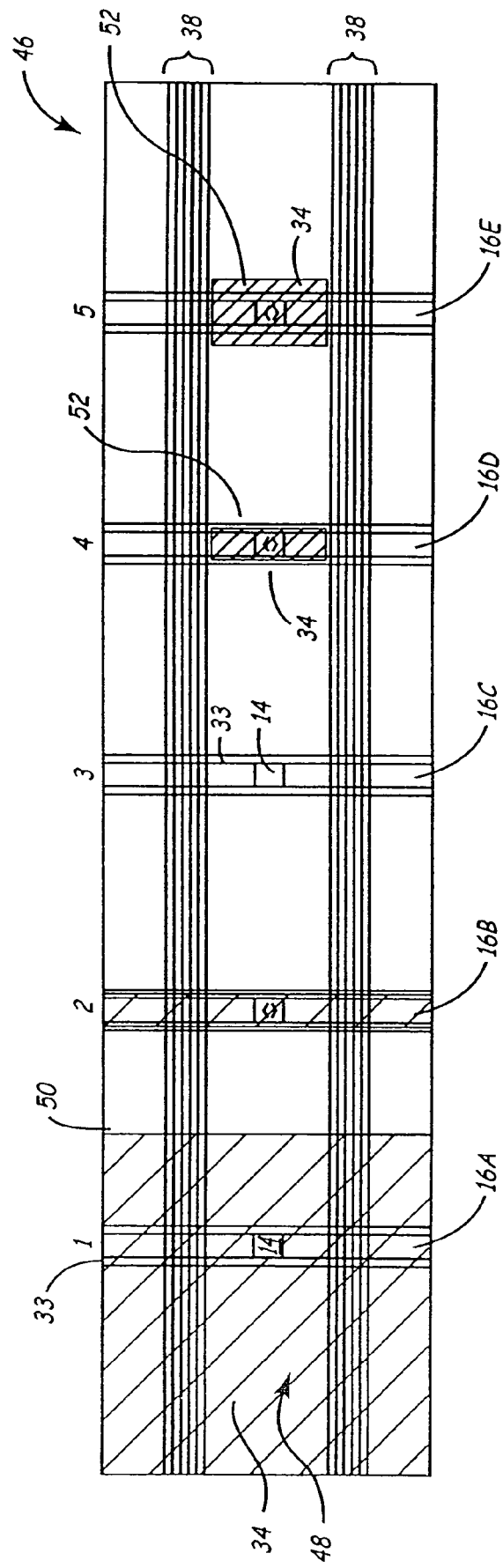
FIG. 16 is a head assembly showing various patterns of thin film.

Turning to FIG. 16, thin film layer 34 can also be configured for use with magnetically isolated channels. Primarily, this accomplished by ceramic sections 32A-32E. However, if thin film layer 34 were continuous from one channel to the next, cross talk would occur, thus eliminating the ability to independently control the channels in so much as non-linear results will occur due to the flux leakage. As such, with any independently driven, multi-channel head 46, the magnetically permeable thin film layer 34 must be absent between the various channels. The pattern 48 of thin film 34 (covering channels 1 and 2) in FIG. 16, illustrates the simplest way of accomplishing this. A strip 50 is devoid of the thin film 34, over the entire length of the head. In this arrangement, the remaining thin film layer 34 extends across the air bleed slots 38. Strip 50 can be formed by preventing the deposition of the thin film 34 in this area during formation, i.e., platting or lithography, or by removing it after its application. The minimum width of strip 50 is determined by the minimum barrier required to prevent magnetic coupling and depends on the specific parameters of the completed head 46. This embodiment has the advantage of maintaining a large film surface which may be advantageous in minimizing the wear of the surface film and thus increase the lifetime of the head.

Alternatively, elimination of areas of thin film 34 between adjacent channels is advantageous in that it eliminates a high permeability flux leakage path that limits the flux across the writing gaps. Hence, elimination of the surface film between the channels will provide for the maximization of magnetic flux flowing uniformly across the writing gaps 36.

Figure 17:
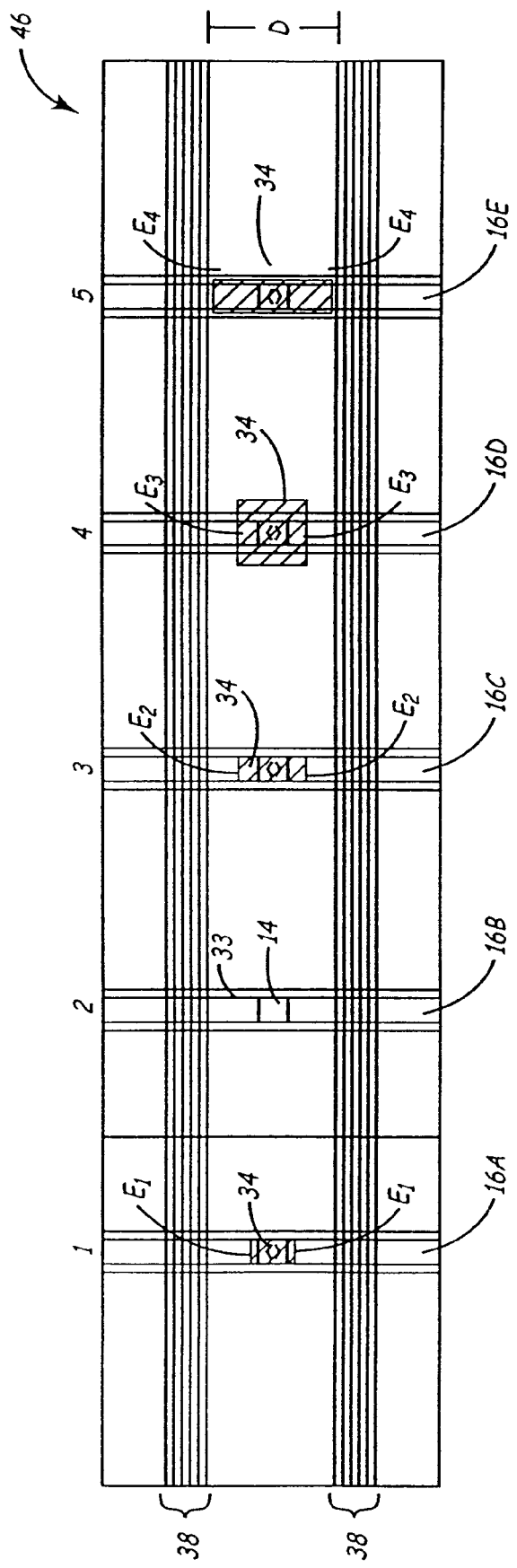
FIG. 17 is a head assembly showing various patterns of thin film.

Channel 3 is shown devoid of a thin film layer 34 for ease of illustration. Writing gaps 36 simply illustrate their position, if thin film layer 34 were present. Channels 4 and 5 have thin film layer 34 applied over them by pattern 52. Here, pattern 52 is contained within the air bleed slots 38, while also providing adequate channel separation. Pattern 52 illustrates that smaller areas of thin film layer 34 are sufficient to accomplish the completion of the head 46. FIG. 17 illustrates a furtherance of this concept. Specifically, channel 1 shows an approximation of what would be the minimal acceptable amount of coverage for thin film layer 34. Here, thin film layer 34 is just sufficient to contact each pole of ferrite column 16A. The amount of contact need only be sufficient to allow the generated magnetic flux to enter and pass through thin film layer 34. The width of thin film layer 34 is shown to be contained within glass beading 33. This width could be reduced further, however the minimum width must be sufficient to allow for writing gaps 36. Though such further minimization is possible, it is optimal to have thin film layer 34 at least equal the width of the ferrite poles 16A to assure proper flux transfer and to prevent the exposure of the corners of ferrite column 16A. For purposes of patterning the channel width of thin film 34, the relevant edges can be defined to be approximately equal to the width of the distance from glass bond 33 from one side to the other. That is, the channel width will fall just inside of or just outside at the glass bonds. Channel 2 is devoid of thin film layer 34 (for ease of illustration), while channels 3-5 show other patterns which are possible. Virtually any size or shaped pattern could be obtained, so long as sufficient channel separation occurs.

Though various patterns are achievable, certain factors will determine which patterns are preferable for any given head 46. To illustrate these factors it should be understood that the thin film 34 layer serves a dual purpose. First, it completes a magnetic circuit by coupling together the poles in the ferrite columns (with or without the additional consideration of channel separation). Second, the thin film layer 34 acts as a tape bearing surface as the media is pulled across the recording head 46. As such, the minimum amount of coverage provided is limited by what is acceptable to create the magnetic circuit. Ultimately, the maximum amount could encompass the entire upper surface of the recording head 46. In some cases, such maximized coverage may be acceptable. As discussed, it is often desirable to avoid any interaction between the thin film layer 34 and the air bleed slots 38. Then, the maximum amount of coverage is defined by the distance D (FIG. 17) between the innermost air bleed slots 38.

An additional consideration arises when an edge (E1-E4) of the thin film layer 34 is located within the area defined by distance D and the width of the head 46. Namely, the media will strike or engage that surface E1-E4 as it moves across the head 46. This is normally not a consideration when the thin film 34 covers the entire head 46 because the edge of the head is by the media. When an edge E1-E4 is located closer to the gaps 36 located over ceramic member 14, and the media engages this edge at speed, it may be caused to skip or jump away from the head 46. This issue is problematic if it is random and unpredictable and/or if the media does not reengage the head prior to the writing gaps 36. Obviously, if it skips the writing gaps 36 the media cannot be properly written. Therefore, if an edge E1-E4 is to occur, it is preferable that it occurs further from the writing gaps 36 occurring over ceramic member 14, as illustrated in channel 5, by edge E4. In this location, if skipping or jumping occurs, the media has a longer distance to correct itself. This self-correction may also be aided by the curvature of the head 46. Furthermore, the pattern shown by channels 4 and 5 is also advantageous in that a majority of the material transition regions are covered by the thin film 34, thus preventing them from damaging or inappropriately writing the media. The transition regions include the transition from ceramic to glass, from glass to ferrite, and from ferrite to ceramic.

To create the various patterns of thin film layer 34, any known method of generating and defining a thin film can by utilized. For example, larger areas can have a thin film deposited on them and then wet etching or ion milling can be used to remove sections. Such techniques are well known and relatively easy to perform.

In operation, magnetic recording head 46 is secured to an appropriate head mount. Magnetic tape is caused to move over and in contact with the tape-bearing surface of the head 46. At the appropriate periodic interval, electrical current is caused to flow through the coils 44. As a result, magnetic flux is caused to flow through the back-bar 40, through the ferrite columns 16A-16E, and through the magnetic thin film 34 (as the ceramic member 14 minimizes a direct flow from one pole of the ferrite column 16A-16E to the other, causing the magnetic flux to shunt through the permeable magnetic film). As the magnetic flux travels through the magnetic thin film 34, it leaks out through the writing gaps 36, thus causing magnetic transitions to occur on the surface of the magnetic tape, in the same pattern and configuration as the gaps 36 itself.

The above head fabrication process has been described with respect to a magnetic recording head employing a timing based servo pattern. However, the process could be applied equally well to any type of surface film recording head.

The present disclosure presents a plurality of elements and concepts which work in a synergistic arrangement to arrive at a highly efficient surface film magnetic recording head. It is to be understood that these various elements and concepts can be effectively utilized alone or in other combinations than disclosed while still remaining within the spirit and scope of the present invention. Namely, using a columned or combed head member in and of itself produces a higher quality and more efficient head. Similarly, removing the high reluctance back-gap and replacing it with one or more magnetically permeable back-bars leads to a better and more efficient surface film-recording head. Utilizing both the combed structure and back-bars produces an optimal head, achieving synergistic results. Finally, utilizing a specific pattern of magnetically permeable thin film to isolate the channels and to act as the tape bearing surface, can be used alone or in combination with the above aspects of the present invention to arrive at a superior recording head.

Figure 18:
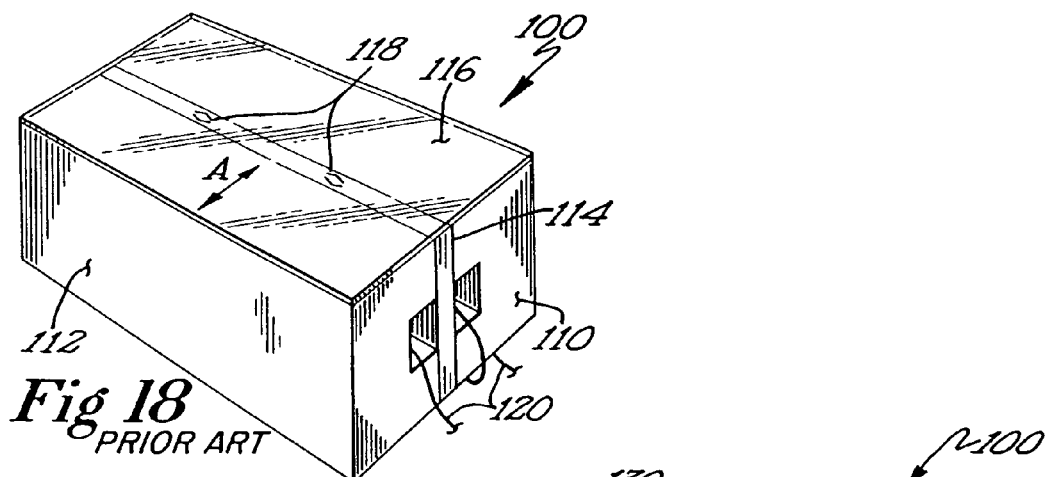
FIG. 18 is a perspective view in a prior art surface thin film magnetic recording head.

Comparing two heads, each wound with two turns of wire and driven by the same single channel drive circuit, the head pursuant to this invention (FIG. 13) exhibits a current rise time in the 20 nanosecond range while the high inductance head made pursuant to the Albrecht et al. patent (FIG. 18) exhibits current rise time in the 50 nanosecond range. The corresponding inductances were measured to be about 250 nH and 700 nH, respectively, for the two heads. The shorter rise time corresponds roughly to the L/R time constant of the head as a circuit element. Hence the low inductance magnetic recording heads of the present invention are capable of recording timing based signals on media resulting in sharper magnetic transitions than media written with previously known heads. As a result, both the heads produced and the media written by those heads will perform significantly better than the prior art heads and the media produced by them. With due consideration to the details of the write circuitry, one can expect to at least double the bandwidth by the use of the low inductance head of the present invention. Even more dramatic results can be expected with the independently driven, multichannel low inductance head, as illustrated in FIG. 12, while taking into account the limitations and expense of the multichannel drive circuitry.

Figure 19:
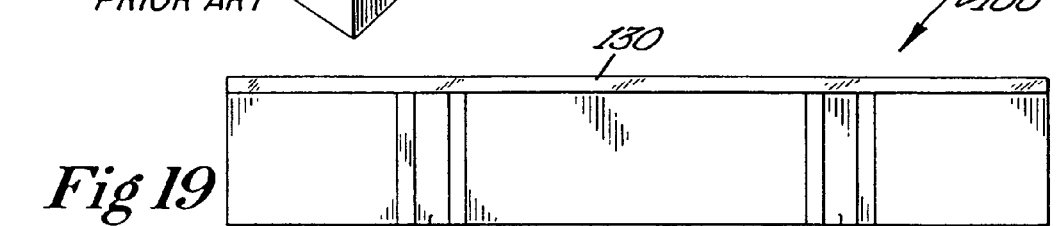
FIG. 19 is a side sectional view of a head substrate having uniform thin film layer extending substantially thereacross.

In accordance with the above teachings, FIG. 19 illustrates a cross section of a thin film magnetic recording head 100 having two isolated channels 110, 120. Though channels 110, 120 are physically isolated from one another, they are not magnetically isolated because magnetically permeable thin film layer 130 is continuous and covers both channels 110, 120. This configuration is advantageous in that is provides a smooth and continuous tape bearing surface. Thus, headwear will likewise be even. Furthermore, there will be exemplary interaction between the media and the tape-bearing surface. The disadvantage is that channels 110, 120 are not magnetically isolated. As explained above, the mechanical advantages of a continuous magnetically permeable surface can produce poor magnetic results due to the leakage of flux into the interchannel area.

Figure 20:
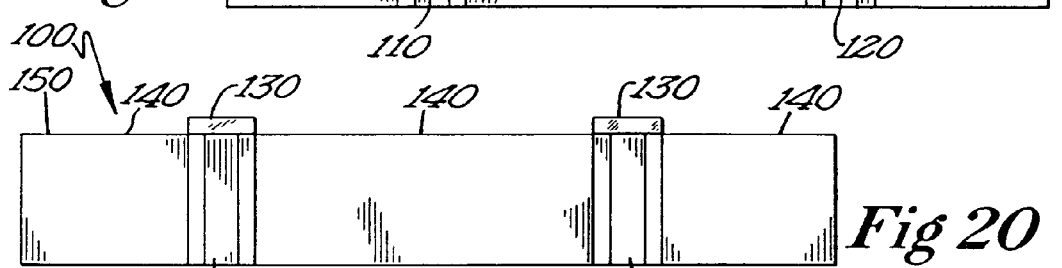
FIG. 20 is a side sectional view of a head substrate having substantial portions of the thin film layer removed so that large spaced or voids are defined therebetween.

To optimally drive each channel, thin film layer 130 can be removed (or selectively applied) to arrive at a pattern similar to that illustrated in FIG. 20. Here, thin film layer 100 only exists in a region above each channel 110, 120. The specific size and shape of these patterns was also described in detail above. This solution provides excellent magnetic isolation, however it generates spaces or voids 140. More specifically, voids 140 are the spaces between the remaining thin film 130 as they extend from the upper surface 150 of the head substrate.

Though the components illustrated in FIG. 20 are not to scale in general or with respect to one another, it does illustrate how voids 140 could be problematic. As the flexible media travels at speed across head 100, portions of the media can sag into voids 140 which may affect the contact between the media and the writing gaps. Furthermore, with these uneven surfaces and differing degrees of contact, film wear is increased near the edges of the film channel where higher contact forces exist. Finally, causing the media to contact these uneven surfaces could possibly damage the media.

Figure 21:
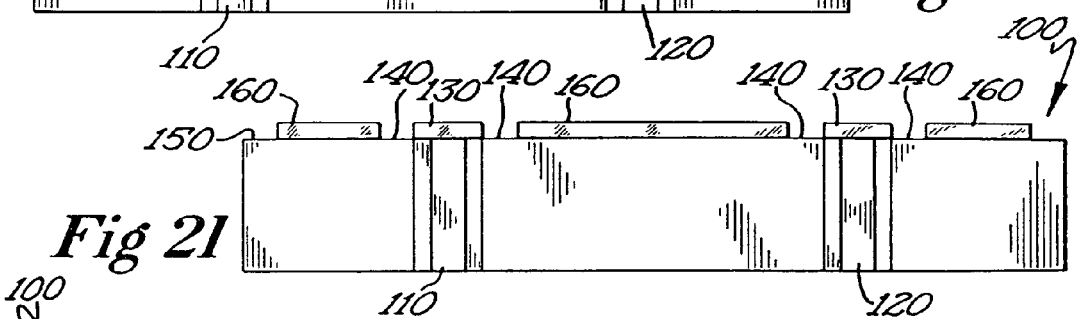
FIG. 21 is a side sectional view of a head substrate having wear pads formed from additional sections of the thin film layer so as to only form relatively small spaces.

FIG. 21 illustrates one solution to this problem. Magnetically permeable thin film 130 exists in a layer having a predetermined thickness above each channel 110, 120. Wear pads 160 also having the same predetermined thickness are formed over much of the remaining surface. Wear pads 160 are formed from the same magnetically permeable thin film material as thin film 130. Voids 140 still exist, but they are much smaller and present much less of a problem when the media contacts the thin film layer. That is, the wear pads 160 and the thin film 130 approximate a continuous surface. As compared to the embodiment illustrated in FIG. 20, a majority of the space defined by voids 140 has been filled in with thin film wear pads 160. The remaining voids (FIGS. 21 and 22) are still sufficient to provide magnetic isolation between channels while providing a larger surface area over which the media is able to uniformly contact. Since the material is the same, wear will be even across the entirety of the head. Since the magnetic media or tape is significantly stiff, it will not sag into the voids. The voids can have any spacing, but will typically be between 1-30 microns wide.

Figure 22:
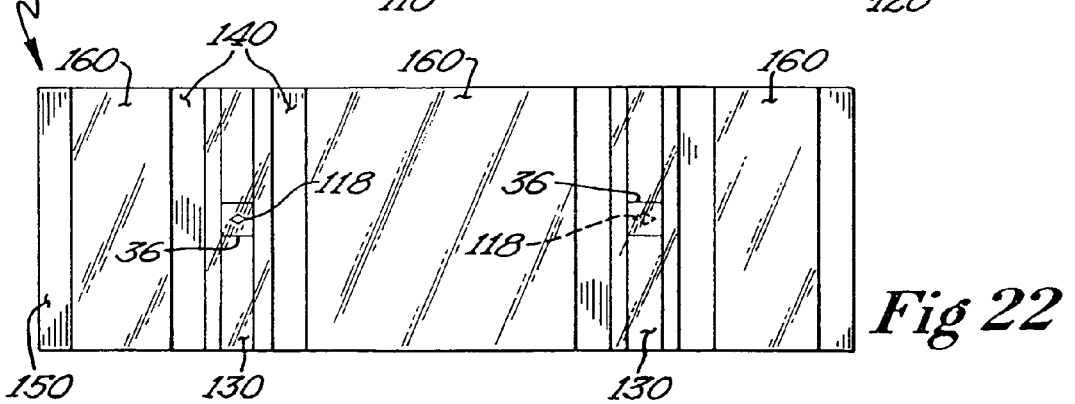
FIG. 22 is a top planar view of the head substrate illustrated in FIG. 21.
Figure 23:
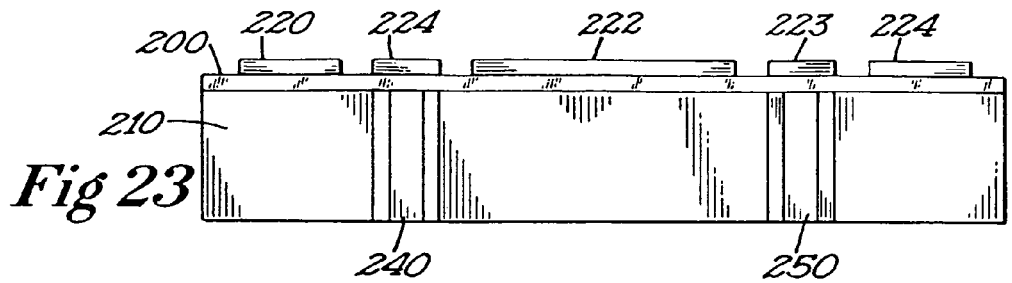
FIG. 23 is a side sectional view of a head substrate having a uniform thin film layer extending thereacross with pre-defined areas of photoresist on top of the thin film layer.
Figure 24:
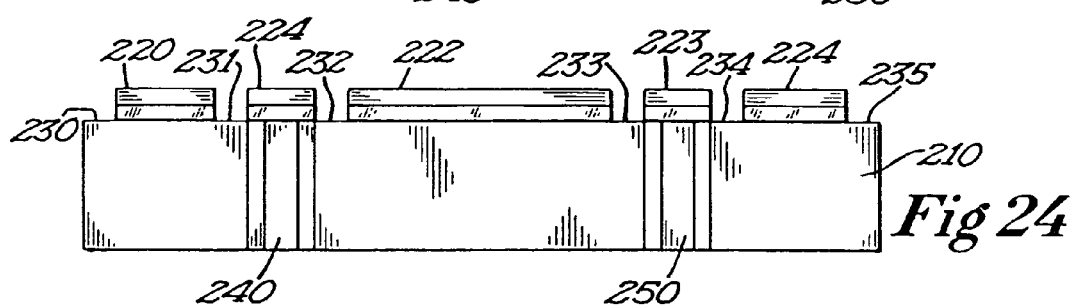
FIG. 24 is a side sectional view of the head substrate of FIG. 23 after a process has removed the exposed sections of the thin film.
Figure 25:
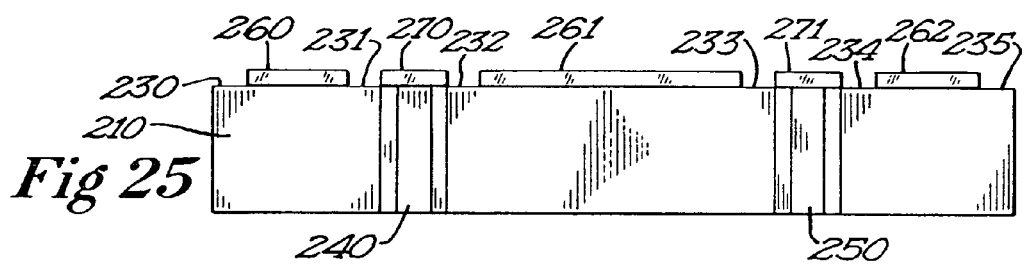
FIG. 25 is a side sectional view of the head substrate of FIG. 24 after the remaining photoresist has been removed.

One process of forming the embodiment illustrated in FIGS. 21-22 is illustrated in FIGS. 23-25. Referring to FIG. 23, a magnetically permeable thin film layer 200 is evenly deposited over an upper surface of head substrate 210. Photoresist 220-224 is patterned on top of thin film layer 200. As illustrated in FIG. 24, head substrate 210 is subjected to an etching process such as ion milling or a chemical etching process (wet etching). As a result, exposed portions of thin film layer 200 are removed, creating voids 230-235. In FIG. 25, the remaining photoresist 220-224 is washed away or otherwise removed. What remains is head substrate 210 having channels 240, 250 with magnetically permeable thin film layer 200 having been sectioned to provide wear pads 260, 261 and 262 and writing channels 270, 271. Wear pads 260, 261 and 262 and writing channels 270, 271, having been formed from the uniform thin film layer 200 have the same height and material characteristics. Magnetic isolation is achieved because of voids 230-235, which magnetically separate channels 240, 250 while still providing a relatively large tape bearing surface. It should be noted that more or less channels could actually be utilized. Voids 230 and 235, if actually located at the endpoints of head substrate 210 need not be present. That is, wear pads 260 and 262 could extend to the ends of head substrate 210.

Figure 26:
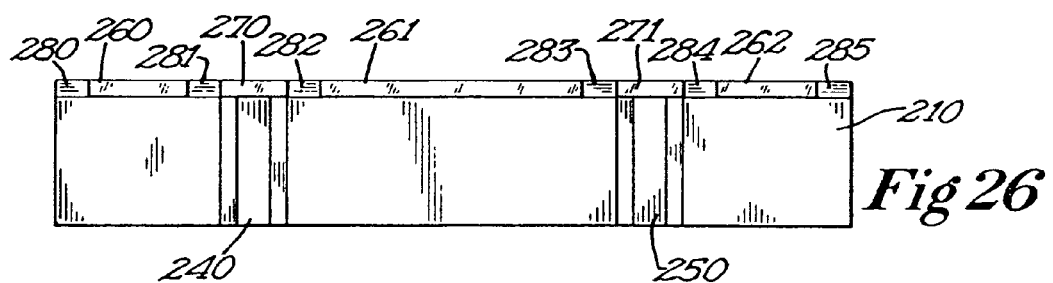
FIG. 26 is a side sectional view of a head substrate having a magnetically permeable thin film disposed atop portions of the upper surface with a magnetically impermeable thin film disposed atop the remaining portions.
Figure 27:
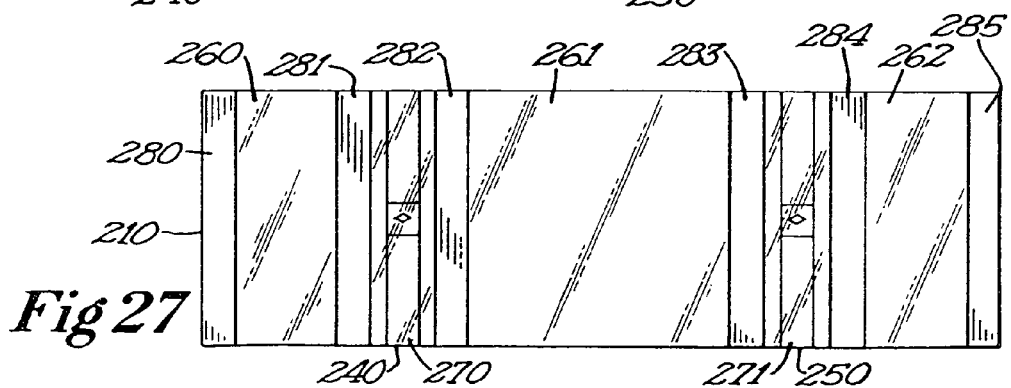
FIG. 27 is a top planar view of the head substrate of FIG. 26.

When the voids 140 between the film sections are relatively narrow, the stiffness of the media will lower the contact pressure on the channel edges as compared to the case of no wear pads. In summary, wear pads 160 in conjunction with relatively narrow voids 140 will approximate a contiguous tape bearing surface that also retains the full character of magnetically isolated channels The above embodiment is advantageous in that it is relatively easy to manufacture, provides more even media-bearing surface, and has more uniform wear characteristics. Voids 230-235 do still exist however, and may be able to affect the media. To prevent this from occurring, FIGS. 26-27 illustrate yet another embodiment. In essence, voids 230-235 have been "filled in" with a magnetically impermeable material to a height even with or slightly less than the magnetically permeable thin film 260-262. The non-magnetically permeable spacers 280-285 can be formed using a lift-off technique. Spacers 280-285 provide magnetic isolation between channels 240, 250. They also provide an even, consistent, and continuous tape-bearing surface. The material can be chosen to have similar wear characteristics to that of the magnetically permeable thin film so that over time, degradation caused by media interaction is fairly uniform.

Figure 28:
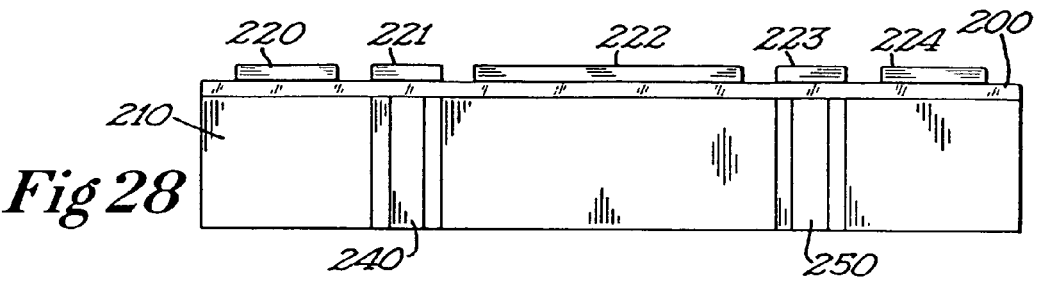
FIG. 28 is a side sectional view of a head substrate having a uniform thin film layer extending thereacross with pre-defined areas of photoresist on top of the thin film layer.
Figure 29:
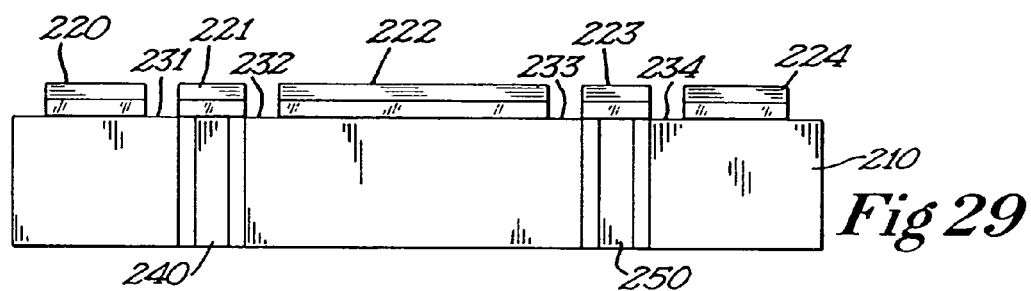
FIG. 29 is a side sectional view of the head substrate of FIG. 28 after a process has removed the exposed portions of the thin film.
Figure 30:
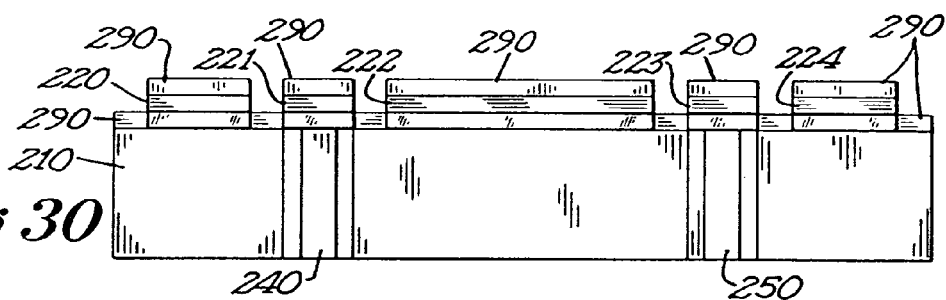
FIG. 30 is a side sectional view of the head substrate of FIG. 29 after a layer of magnetically impermeable thin film has been deposited.
Figure 31:
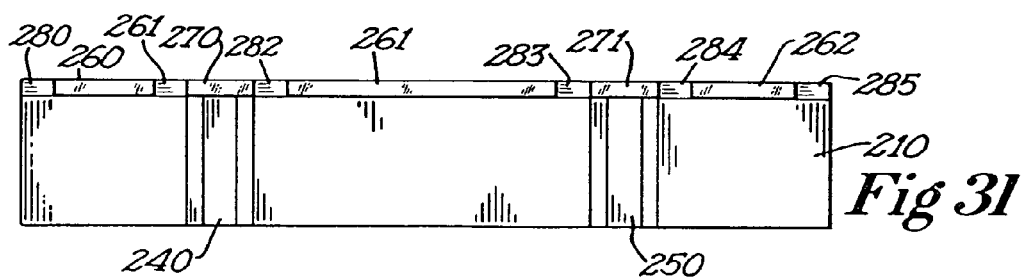
FIG. 31 is a side sectional view of the head substrate of FIG. 30 after the photoresist has been removed.

To form this embodiment, a uniform magnetically permeable thin film layer 200 is deposited on head substrate 210 as illustrated in FIG. 28. Photoresist patterns 220-224 are applied atop thin film layer 200. This structure is then etched so that portions of thin film layer 200 are removed leaving voids 230-234, as illustrated in FIG. 29. Then a magnetically impermeable material 290 is uniformly applied to the exposed surfaces, as illustrated in FIG. 30. Photoresist 220-224 is then washed away, taking with it portions of impermeable material 290. What remain are non-magnetically permeable spacers 280-285 as illustrated in FIG. 31. Because of the accuracy of the deposition techniques, spacers 280-285 are generally equal in height to the magnetically permeable material 260, 261, 263, 270, and 271 so as to form an even and continuous tape-bearing surface.

Figure 32:
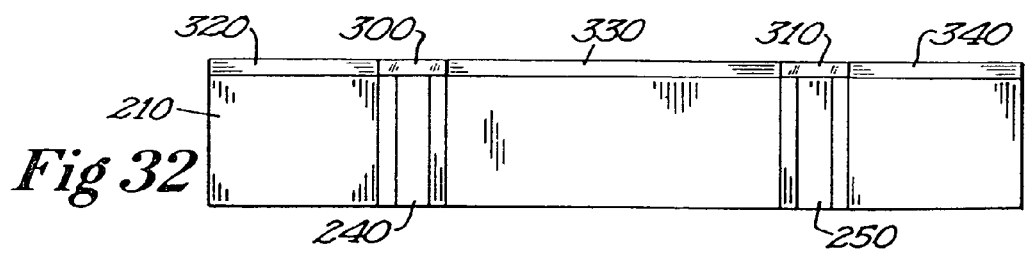
FIG. 32 is a side sectional view of a head substrate having a magnetically permeable thin film disposed above each channel and a magnetically impermeable thin film disposed between each channel.
Figure 33:
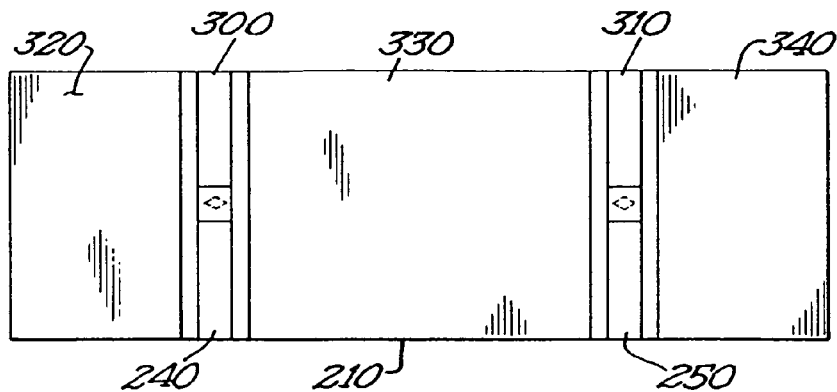
FIG. 33 is a top planar view of the head substrate of FIG. 32.
Figure 34:
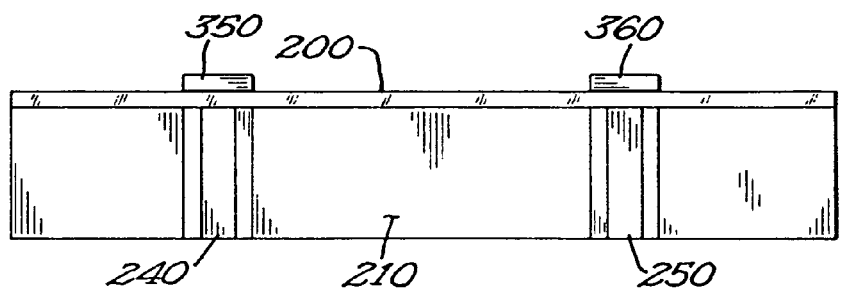
FIG. 34 is a side sectional view of a head substrate having a magnetically permeable thin film disposed across the upper surface thereof and areas of photoresist patterned above each channel.
Figure 35:
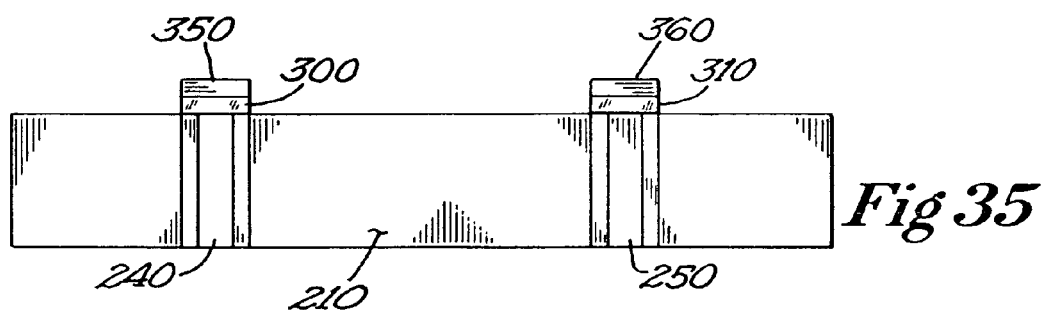
FIG. 35 illustrates the head substrate of FIG. 34 after the exposed portions of the thin film have been removed.
Figure 36:
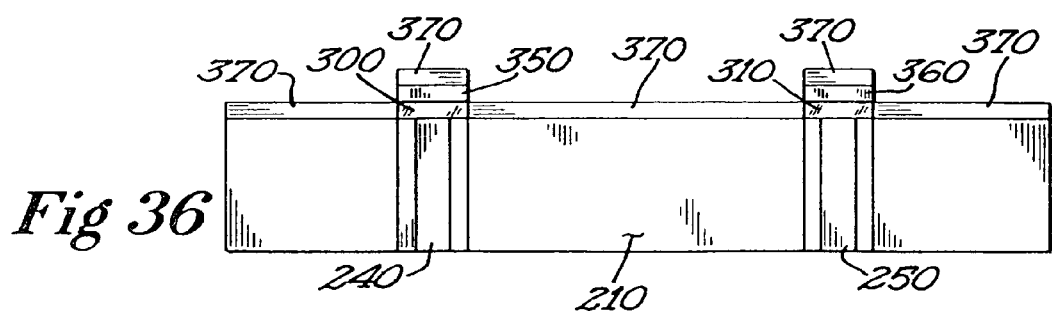
FIG. 36 illustrates the head substrate of FIG. 35 after a magnetically impermeable thin film has been deposited.
Figure 37:
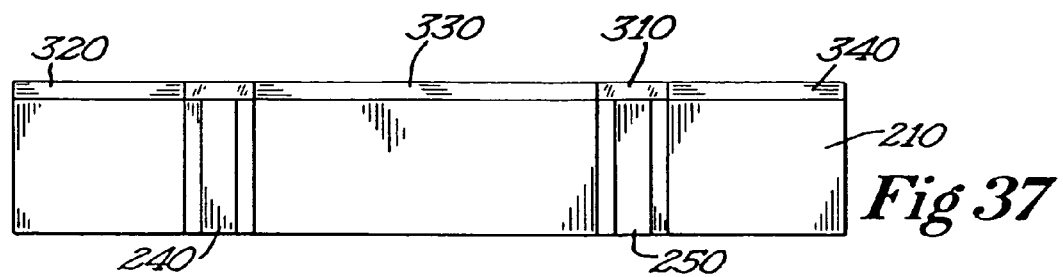
FIG. 37 illustrates the head substrate of FIG. 36 after the photoresist has been removed.

FIGS. 32 and 33 illustrate a variation of the embodiment illustrated in FIG. 26. A continuous tape-bearing surface is provided however magnetically permeable areas 300, 310 only exist over each of the channels. The remainder of the tape-bearing surface is comprised of non-magnetically permeable spacers 320, 330, 340. The lift off technique is again utilized, as illustrated in FIG. 34-37. A magnetically permeable thin film layer 200 is deposited on head substrate 210. Photoresist patterns 350, 360 are then applied above each channel 240, 250. The exposed portions of thin film layer 200 are then etched away. A magnetically impermeable layer 370 is then applied across the entire exposed surface. Finally, photoresist patterns 350, 360 are washed away leaving an even and continuous tape-bearing surface.

Figure 38:
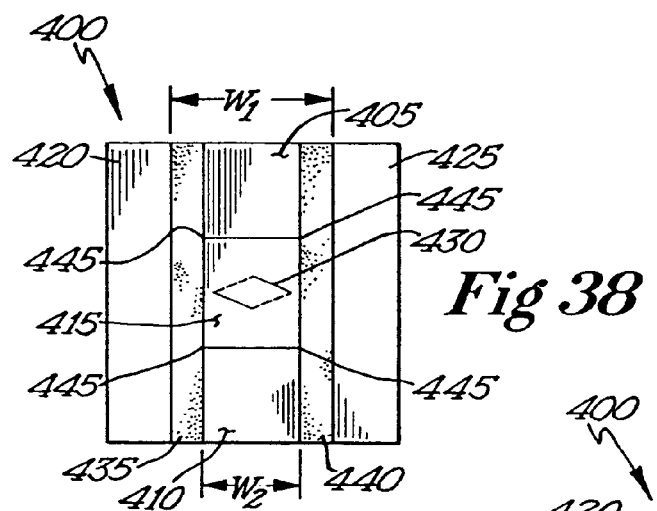
FIG. 38 is a top, planar view of a portion of a head substrate.

FIG. 38 illustrates a portion of a single channel and is generally referred to as 400. Channel portion 400 includes ferrite portions 405, 410, ceramic gap 415 and ceramic spacers 420, 425 as described above. Of course other materials having the appropriate magnetic characteristics could be utilized instead. Above some or all of this structure, a magnetically permeable thin film (not illustrated) is deposited. Writing gaps 430 are illustrated where they would be located if the thin film were present. Glass bonds 435, 440 connect ferrite portions 405, 410 to ceramic spacers 420, 425 while providing a barrier between them.

When the thin film is in place, a magnetic circuit is formed. Magnetic flux moves from ferrite portion 405, through the thin film layer and into ferrite portion 410 (or it could travel in the opposite direction). As it passes through the thin film layer, flux leakage through writing gaps 430 will write a pattern on the tape or other media as it passes close by. Ideally, a uniform flux density is achieved across the width of channel 400 (left to right, as illustrated). If this occurs, the written pattern will likewise be uniform.

Figure 39:
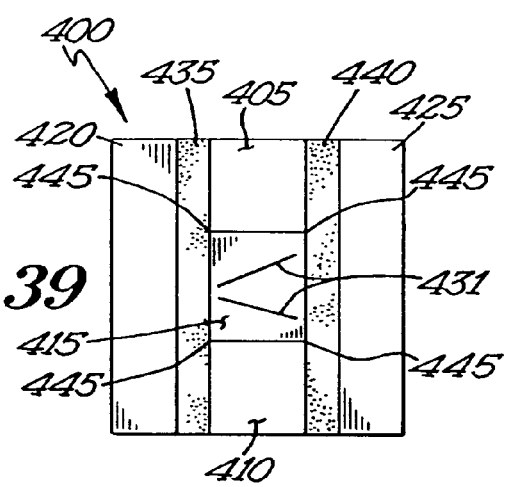
FIG. 39 is a top, planar view of a portion of a head substrate.

The uniformity of the magnetic flux will be determined by the thin film layer where two competing considerations must be taken into account. In the present case, we are concerned with a magnetically isolated channel 400. Thus, the thin film layer cannot form a continuous path to any adjacent channel (not illustrated). Therefore, the first consideration is to determine how wide (from left to right, as illustrated) to limit the thin film layer. All that is required for magnetic channel separation is relatively narrow zone absent of magnetically permeable thin film. While, achieving channel separation such a wide thin film layer would allow for leakage around writing gap 430. Depending upon the configuration of writing gap 430, 431 (FIGS. 38 and 39), this flux leakage would be more or less problematic. The symmetrical writing gap 430 would result in symmetrical flux leakage about either side of it. However, an asymmetrical writing gap 39 would have more flux leakage where the separate gaps are closer (left side, as illustrated) than where they are spaced apart. Thus, uniformity of the flux across the width of writing gap 431 would not be achieved. In both cases, flux density across the gap would be decrease when flux leakage is permitted.

Thus, flux leakage around writing gaps 430, 431 is undesirable. Since flux leakage is facilitated by having a wider thin film layer, decreasing the width of this layer will minimize the problem. However, the second consideration is that making the thin film layer too narrow could expose ferrite portions 405, 410 and in particular ferrite corners 445. Ferrite corners 445 are local maximums and can-write the media if exposed. This may or may not be acceptable to the media manufacturer or the drive system manufacturer. Thus, at a minimum the thin film layer should have a width of W2 to prevent exposure of any portion of ferrite portions 405, 410.

As media passes over channel portion 400 (top to bottom or vice versa as illustrated), there can be lateral wear of the thin film layer. That is, the edge of the thin film layer parallel to glass bonds 435, 440 will wear away over time. Therefore, it is preferable not to have the thin film layer equal to the width W2, but rather greater than it. Ideally, the width of the thin film layer will fall between width W1 and width W2. This will reasonably limit flux leakage while preventing exposure of ferrite portions 405, 410, both when newly constructed and after a certain amount of lateral wear has occurred.

Figure 40:
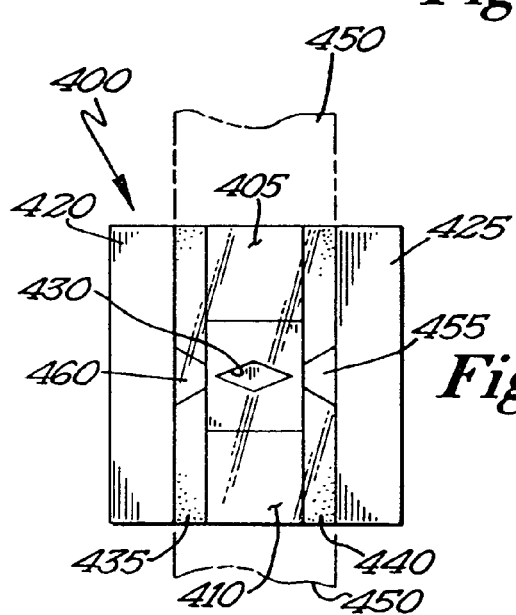
FIG. 40 is a top, planar view of a portion of a head substrate illustrating a patterned thin film layer.

FIG. 40 illustrates a furtherance of this concept. Here, thin film layer 450 is illustrated and has a maximum width equal to W1 (FIG. 38) and a minimum width equal to W2. More specifically, sections 455, 460 have been removed from thin film layer 450 over ceramic gap 415. Sections 455, 460 prevent substantially any flux leakage from occurring around writing gap 430. However, this minimization only occurs over ceramic gap 415 so that ferrite portions 405, 510 are fully covered and excess material is provided to account for lateral wear.

As described above, it may be desirable to deposit magnetically impermeable material on the head substrate in those areas where thin film layer 450 is absent. In that regard, sections 455, 450 could be likewise filled in to provide a smooth and continuous tape bearing surface with thin film layer 450. In addition, this would prevent lateral wear from encroaching on writing gap 430. As also discussed in greater detail above, the height (as illustrated) of the thin film layer can be varied. Voids in this direction could also be filled with a magnetically impermeable material.

FIG. 40 also illustrates another concept. Writing gaps 30 are illustrated in a particular timing based pattern. Writing gaps 30 extend through the surface of thin film layer 450. Thus, as flux passes through thin film layer 450, a portion thereof escapes through gaps 130 and writes any magnetic media in proximity thereto. These gaps 130 are therefore open and debris can accumulate within them.

The previous sections above describe, in general, providing a smooth and continuous tape-bearing surface with and/or around thin film layer 450. It may also be advantageous to fill in writing gaps 130 with non-magnetically permeable material to prevent the accumulation of debris. This can be accomplished through a variety of techniques. In one particular application, a Focussed Ion Beam (FIB) can be used to precisely deposit material within writing gaps 130 to provide a smooth and continuous tape-bearing surface. The FIB may be used to initially cut writing gap 130 through thin film layer 450 as well. The use of a FIB to fill in material is advantageous because of the precision that is achievable. To that end, reference is made to application Ser. No. 09/255,762, filed Feb. 23, 1999, which is herein incorporated by reference in its entirety.

One aspect of the present invention provides for forming an even and supportive media bearing surface that still allows for the magnetic isolation of the independent channels. This can be accomplished by leaving sufficient space to provide magnetic isolation while maximizing the area of the tape-bearing surface. Alternatively, magnetically impermeable material can be utilized to form a continuous surface. To produce these configurations, a variety of techniques can be utilized to appropriately apply and/or remove the various thin film materials. It should also be appreciated that the disclosed techniques can be utilized on magnetic heads having any number of channels.

While the present application has been described with reference to specific material that may be added to a substrate to reduce or eliminate gaps or space and the use of photoresist has been discussed as a masking layer, these materials are not meant to be limiting. That is, various other materials can be utilized as desired to reduce or eliminate the gaps or spaces. In addition, materials other than photoresist can be used to define a pattern and as a masking layer, so long as the material can be appropriately applied and subsequently removed without damaging the substrate.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

I claim:
1. A magnetic recording head comprising:
   a magnetically permeable thin film layer forming a tape-bearing surface of a head substrate;
   wherein the magnetically permeable thin film layer has been patterned with spaces to form one or more magnetically energizable regions, which each form part of an energizable magnetic circuit of a respective magnetic recording channel, and one or more substantially non-magnetically energized regions, which do not form part of a magnetic circuit of a magnetic recording channel, the magnetically energizable regions and substantially non-magnetically energized regions together forming a substantially uniform and quasi-continuous tape bearing surface, wherein the spaces between the regions are sufficient to allow for magnetic isolation between the regions.

2. The magnetic recording head of claim 1, wherein a width of each of the spaces is a minimum required to provide magnetic isolation between the regions.

3. The magnetic recording head of claim 1, wherein the width of each of the spaces is between 1 and 30 microns.

4. A magnetic recording head comprising:
  a magnetically permeable thin film layer forming a tape-bearing surface of a head substrate;
  wherein the magnetically permeable thin film layer has been patterned with spaces to form more than one magnetically energizable region, forming a substantially uniform and quasi-continuous tape bearing surface, wherein the spaces between the regions are sufficient to allow for magnetic isolation between the regions and the patterned thin film layer approximates a continuous tape-bearing surface; and
  wherein each of the magnetically energizable regions form part of an energizable magnetic circuit of a respective magnetic recording channel and each recording channel includes a separate and independent coil for energizing the respective magnetically energizable region.

* * * * *